US009534130B2

United States Patent
Cai et al.

(10) Patent No.: US 9,534,130 B2
(45) Date of Patent: Jan. 3, 2017

(54) COMPOSITION AND METHOD OF MAKING AN AQUEOUS MAGNETIC INK CHARACTER RECOGNITION INKJET INK

(71) Applicant: Troy Group, Inc., Costa Mesa, CA (US)

(72) Inventors: Xiaorong Cai, Mount Pleasant, SC (US); Michael R. Riley, Steubenville, OH (US); Brian Lewis, Wheeling, WV (US)

(73) Assignee: TROY GROUP, INC., Costa Mesa, CA (US)

( * ) Notice: Subject to any disclaimer, the term of this patent is extended or adjusted under 35 U.S.C. 154(b) by 37 days.

(21) Appl. No.: 14/661,754

(22) Filed: Mar. 18, 2015

(65) Prior Publication Data

US 2015/0337150 A1    Nov. 26, 2015

Related U.S. Application Data

(60) Provisional application No. 62/000,937, filed on May 20, 2014.

(51) Int. Cl.
| | | |
|---|---|---|
| *C09D 11/322* | (2014.01) | |
| *C09D 11/38* | (2014.01) | |
| *C09D 11/106* | (2014.01) | |

(52) U.S. Cl.
CPC .............. *C09D 11/38* (2013.01); *C09D 11/106* (2013.01); *C09D 11/322* (2013.01)

(58) Field of Classification Search
CPC ............................... C09D 11/322; C09D 11/38
USPC ..................... 106/31.9, 31.92; 252/62.54
See application file for complete search history.

(56) References Cited

U.S. PATENT DOCUMENTS

| | | | | |
|---|---|---|---|---|
| 4,026,713 A | * | 5/1977 | Sambucetti | ............... H01F 1/44 106/31.64 |
| 5,026,427 A | * | 6/1991 | Mitchell | ............... C09D 11/322 106/31.6 |
| 5,240,626 A | * | 8/1993 | Thakur | ................... H01F 1/445 252/62.54 |
| 5,670,078 A | * | 9/1997 | Ziolo | ..................... B82Y 25/00 252/62.54 |
| 5,936,008 A | | 8/1999 | Jones et al. | |
| 6,726,757 B2 | | 4/2004 | Sarkisian et al. | |
| 6,746,527 B1 | | 6/2004 | McElligott et al. | |
| 6,767,396 B2 | | 7/2004 | McElligott et al. | |
| 7,255,433 B2 | | 8/2007 | McElligott et al. | |
| 8,236,192 B2 | * | 8/2012 | Breton | ................. C09D 11/322 252/62.54 |
| 8,409,341 B2 | * | 4/2013 | Iftime | ................... H01F 1/0054 106/31.92 |

(Continued)

OTHER PUBLICATIONS

International Search Report mailed Aug. 11, 2015 for PCT/US2015/030181; 2 pages.*

(Continued)

*Primary Examiner* — Helene Klemanski

(57) ABSTRACT

An aqueous MICR inkjet ink includes between 20% to 60% by weight of a magnetic iron oxide with cobalt doping, pigment dispersion, mixed with between 5% to 30% by weight of a humectant, in a water solution emulsion. The dispersion is milled in a wet media mill to obtain particle size in the 150 nm range. Additional humectant, surfactants, jetting agents, and stabilizing additives are added for the final ink composition.

3 Claims, 1 Drawing Sheet

(56) References Cited

U.S. PATENT DOCUMENTS

| | | | |
|---|---|---|---|
| 8,597,420 B2* | 12/2013 | Iftime | H01F 1/0054 |
| | | | 106/31.9 |
| 8,801,954 B2* | 8/2014 | Iftime | C09D 11/322 |
| | | | 252/62.54 |
| 8,815,393 B2 | 8/2014 | Contadini et al. | |
| 9,390,846 B2 | 7/2016 | Villwock | |
| 2004/0000254 A1 | 1/2004 | McElligott et al. | |
| 2009/0321676 A1 | 12/2009 | Breton et al. | |

OTHER PUBLICATIONS

Written Opinion of the International Search Authority mailed Aug. 11, 2015 for PCT/US2015/030181; 5 pages.*

* cited by examiner

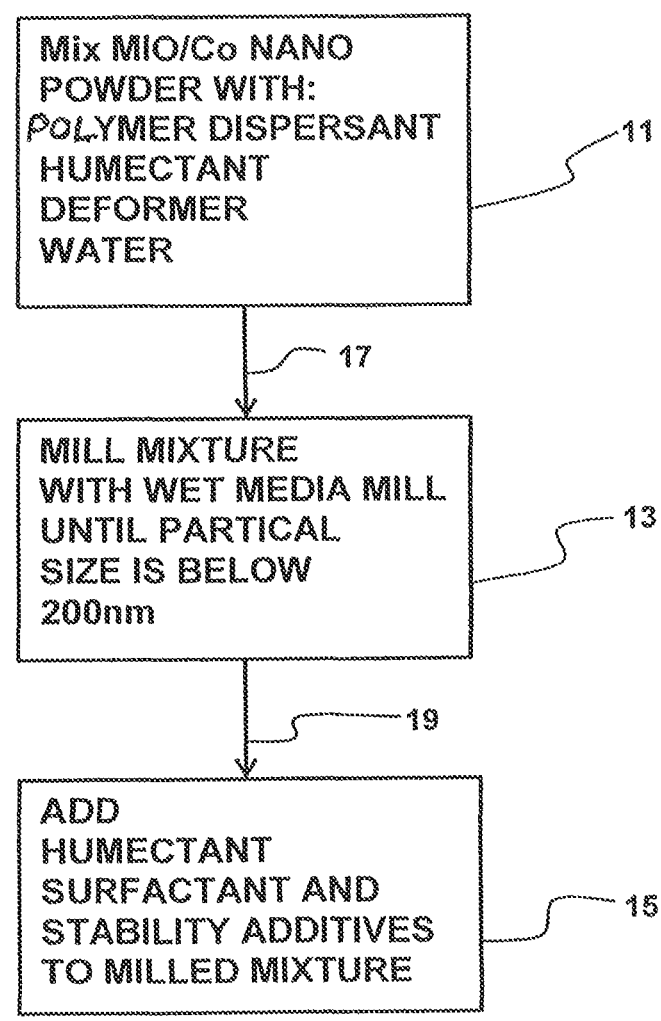

COMPOSITION AND METHOD OF MAKING AN AQUEOUS MAGNETIC INK CHARACTER RECOGNITION INKJET INK

CROSS REFERENCE TO RELATED APPLICATION

This application claims benefit of application Ser. No. 62/000,937 filed May 20, 2014 for Method For Processing Magnetic Ink Jet Ink, which is fully incorporated herein by reference.

BACKGROUND OF THE INVENTION

1. Field of the Invention

The present invention relates to magnetic inks and more particularly to an aqueous magnetic ink composition and a method for making an aqueous magnetic ink character recognition (MICR) ink for use in desktop inkjet printers.

2. Description of Related Art

Magnetic Ink Character Recognition (MICR) is a printing technology used primarily in the banking and financial services markets. The process of MICR encoding involves the printing of magnetically readable characters. These characters are printed using methods such as impact printing (MICR ribbons), electrophotographic printing (MICR toner) and traditional offset printing (MICR ink). More recently, MICR printing has been attempted using inkjet technology.

The printing of MICR characters using inkjet printing presents unique challenges, such as sufficient suspension of magnetic material in a fluid, adequate ink drying, and successful permanence or adhesion of the MICR ink to a given substrate.

MICR inkjet ink requirements include high pigment loadings in the ink to achieve an acceptable MICR signal level. Desktop inkjet printers require low viscosity inks. Providing a low viscosity ink with sufficient magnetic pigment loading to produce acceptable MICR signal levels, present a significant challenge.

Prior art MICR inks for inkjet printers have failed to create an ink that is stable enough for use in desktop inkjet printers and have the required minimum magnetic resonance.

U.S. Pat. No. 6,767,396, granted Jul. 27, 2004, is directed to a process for making an aqueous MICR inkjet ink that uses surfactants and grinding of iron oxide particles, the only achieving a peak magnetic resonance of about 20 emu/g.

U.S. Pat. No. 6,746,527, granted Jun. 8, 2004, is directed to an aqueous MICR inkjet ink composition which uses a combination of surfactants, an anionic surfactant and a nonionic surfactant for dispersion of the iron oxide particles.

U.S. Pat. No. 6,726,757, granted Apr. 27, 2004, is directed to an aqueous MICR inkjet ink composition that coats the iron oxide particles with a hydrophobic coating to aid in dispersion of the particles.

U.S. Pat. No. 7,255,433, granted Aug. 14, 2007, is directed to a multiple pass inkjet printing process using the aqueous MICR inkjet ink discussed in the above patents. The process requires laying down at least two layers of the MICR inkjet ink to achieve the minimum signal load required by the ANSI standard.

Accordingly, there is a need for a magnetic ink composition and a method of making a low viscosity MICR inkjet ink suitable for use in desktop inkjet printers.

SUMMARY OF THE INVENTION

An inkjet ink composition having between 20% to 60% by weight of a magnetic iron oxide with cobalt doping pigment dispersion, and between 5% to 30% by weight of a humectant in an aqueous carrier has been found suitable for use in desktop inkjet printers while also providing the ANSI required signal level with only one layer of MICR inkjet ink.

A preferred method of making the inkjet ink includes preparing a magnetic iron oxide with cobalt doping pigment (MIO/Co) dispersion, including a polymer dispersant, a deformer and deionized water. The MIO/Co dispersion is milled in a wet media mill to obtain average particle size below 150 nm. The dispersion mixture contains between 20% to 60% by weight of magnetic iron oxide with cobalt doping pigment and between 5% to 35% by weight of humectant. This MIO/Co dispersion is then mixed with additional humectants, surfactants jetting aids and stabilizing additives, to obtain the desired inkjet ink composition.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 1 is a block diagram illustrating a preferred method for making a magnetic iron oxide with cobalt doping pigment inkjet ink according to the present invention;

DETAILED DESCRIPTION OF THE PREFERRED EMBODIMENTS

A method of making an aqueous magnetic ink character recognition (MICR) inkjet ink is illustrated in FIG. 1. A magnetic iron oxide with cobalt doping (MIO/Co) aqueous dispersion is created first. An iron oxide with cobalt doping pigment (typically in the form of nano powder) is mixed 11 with a polymeric dispersant, a humectant, a deformer and deionized water. The MIO/Co dispersion is preferably between about 20% to 60% by weight. In one embodiment, the MIO/Co dispersion is a magnetic iron oxide with cobalt doping nano powder (available from Cathay Industries USA of Valparaiso, Ind.). This MIO/Co nano powder has magnetic characteristics that can be detected by a MICR reader.

The polymeric dispersants for this application may include acrylic copolymers, polystyrene acrylic polymers, alkali salts of sulphonated naphthalene formaldehyde condensates, lignin or lignin derivatives such as lignosulphonate, reaction products with alkali sulfite and formaldehyde and other block copolymer with pigment affinic groups and the dispersion mixture contains between 5% to 25% by weight of the polymeric dispersant. The ratio of MIO/Co pigment to polymeric dispersant by weight is between 1 to 1 and 10 to 1.

The organic solvents used to process the MIO/Co dispersion should be the same as used in the final ink composition. This reduces further dilution during the ink formulating process and keeps high pigment loadings in the final ink.

A suitable deformer for use in the MIO/Co dispersion may include a siloxane-based deformer currently sold under the trade name Surfynol®. This deformer is available from Air Products and Chemicals, Inc. of Allentown, Pa.

After pre-mixing the MIO/Co dispersion, the polymer dispersant, the humectant, the deformer and water into an emulsion, the mixture is then moved, 17, to a wet media mill such as an Eiger Mini Motormill Model No. MKII, M250, available from Engineered Mills, Inc. of Grayslake, Ill.

The mixture is milled 13 in the wet media mill. The mill should be run for between 1 to 8 hours, until the average particle size is at least 200 nm or smaller and preferably 150 nm or smaller. The particle size is preferably measured every hour during milling using a Malvern Nano-Z90 Zetasizer, available from Malvern Instruments, Inc. of Westborough, Mass.

Additional humectants, surfactant, and stability additives are added, 15, to the final emulsion 19, from the wet media mill to produce the final inkjet ink composition. The additional humectants, surfactants and other additives are added in quantities that do not dilute the amount of MICR pigment in the final inkjet ink.

Table 1, below, illustrates four examples of typical MIO/Co dispersions suitable for formulating MICR inkjet ink. The amount of each component used in a specific dispersion is indicated by percentage of total weight of the final dispersion composition.

TABLE 1

| Ingredient | Dispersion 1 | Dispersion 2 | Dispersion 3 | Dispersion 4 |
|---|---|---|---|---|
| MIO/Co Pigment Nano Powder | 26% | 26% | 35% | 35% |
| Dispersant 1 | 8.70% | 0.00% | 8.70% | 8.70% |
| Dispersant 2 | 0% | 8.70% | 0% | 0% |
| P/D Ratio | 3 | 3 | 3 | 3 |
| Deformer | <1% | <1% | <1% | <1% |
| 2-Pyrrolidinone | 0% | 0% | 0% | 6% |
| Triethylene Glycol | 0% | 0% | 0% | 2% |
| 1-Methoxyl-2-propanol | 0% | 0% | 0% | 2% |
| D. I. Water | Balanced | Balanced | Balanced | Balanced |
| Final Avg Particle size (nm) | 112 | 151 | 104 | 101 |

The MIO/Co nano powder used in the examples is available from Cathay Industrial. Dispersant 1, in the left most column in the table, uses Joncryl HPD acrylic polymer, available from BASF Corp. of Florham Park, N.J. Dispersant 2, in the table, is Disperse BYK acrylic polymer solution, available from BYK Chemie of Wesel, Germany. The preferred ratio of MIO/Co pigment powder to dispersant by weight in the examples are approximately 3 to 1.

The MIO/Co dispersions illustrated in Table 1 have been used to formulate MICR inkjet inks. In order to ensure high print quality and a sufficient magnetic field for the MICR inkjet ink formulation using the above dispersions, the final composition should include between 20% to 60% MIO/Co pigment dispersion by weight with humectants, surfactants and water being between 40% to 80% by weight.

Humectants are included to prevent the fluids from drying or forming films on micro-fluid jetting device nozzle plates. Suitable humectants include glycerol, dipropylene glycol (DPG), tripropylene glycol (TPG), triethylene glycol (TEG), tetraethylene glycol, diethylene glycol (DEG), 1,2-propanediol, 1,3-propanediol, 1,5-pentanediol, polyethylene glycol (PEG), 1,3-propanediol, 1-methoxy-2-propanol, 1,2-hexanediol, 2-pyrrolidone, 1-(2-hydroxyethyl)-2-pyrrolidone, trimethyolpropane, propylene glycol methyl ether, diethylene glycol butyl ether, and mixtures thereof.

A minimum amount of humectant should be used in the final ink composition in order to provide good start-up quality and jettability. The amount of humectant should not significantly increase the viscosity of the ink. In order to achieve these goals, the ink should include between 10% to 30% humectant by weight.

Surfactants may optionally be added in order to modify the surface tension and/or the viscosity of the ink. The surfactants may be used to adjust the jettability characteristics and the wetting characteristics of the ink on a substrate. The final ink composition should include only the minimal amount of surfactants necessary in order for the ink to achieve reliable jetting. This is because surfactants having a low molecule weight may attack the polymeric dispersants in the surface of the MIO/Co particles causing instability of the MIO/Co dispersion. In order to achieve the desired characteristics for the inkjet ink composition, the amount of total surfactants in the ink may range between about 0% to 2% by weight.

Suitable surfactants for modifying the surface tension and viscosity in the inkjet ink may include, but are not limited to, fluorosurfactants, such as Capstone surfactants, available from DuPont of Wilmington, Del., APFS® surfactants, available from Advanced Polymer, Inc. of Carlstadt, N.J., Chemguard®, available from Chemguard Inc. of Mansfield, Tex., Nevec, available from 3M of St. Paul, Minn.; alkylaryl polyether alcohol non-ionic surfactants, such as octylphenoxy-polyethoxyethanol, available from Dow Chemical Company of Midland, Mich. under the trade name TRITON®; alkylamine ethoxylates non-ionic surfactants, available from Dow Chemical Company of Midland, Mich. under the trade name TRITON® including TRITON® CF-10 and under the trade name TERGITOL®; ethoxylated acetylenic diol surfactants, available from Air Products and Chemicals, Inc. of Allentown, Pa. under the trade names SURFYNOL® and Dynol®; polysorbate products, available from ICI Chemicals & Polymers Ltd. of Middlesborough, UK under the trade name TWEEN®; polyalkylene and polyalkylene modified surfactants, available from Crompton OSI Specialties of Greenwich, Conn., under the trade name SILWET®; polydimethylsiloxane copolymers and surfactants, available from Momentive Performance Materials Inc. of Waterford, N.Y. under the trade name COATOSIL®; alcohol alkoxylates nonionic surfactants, available from Uniqema of New Castle, Del., under the trade names RENEX®, BRIJ®, and UKANIL®; sorbitan ester products, available from Omya Peralta GmbH of Hamburg, Germany under the trade names SPAN® and ARLACEL®; alkoxylated esters/polyethylene glycol surfactants, available from ICI Chemicals & Polymers Ltd. of Middlesborough, UK under the trade names TWEEN®, ATLAS®, MYRJ® and CIRRASOL®; alkyl phosphoric acid ester surfactant products such as amyl acid phosphate, available from Chemron Corporation of Paso Robles, Calif., under the trade name CHEMPHOS® TR-421; alkyl amine oxides, available from Chemron Corporation of Paso Robles, Calif. under the trade name CHEMOXIDE®; anionic sarcosinate surfactants, available from Hampshire Chemical Corporation of Nashua, N.H. under the trade name HAMPOSYL®; glycerol esters or polyglycol ester nonionic surfactants, available from Calgene Chemical Inc. of Skokie, Ill. under the trade name HODAG®, available from Henkei-Nopco A/S of Drammen, Norway under the trade name ALPHENATE®, available from Hoechst AG of Frankfurt, Germany under the trade name SOLEGAL® W, and available from Auschem SpA of Milan, Italy under the trade name EMULTEX®; polyethylene glycol ether surfactants, available from Takemoto Oil and Fact Co. Ltd. of Japan under the trade name NEWKALGEN®; modified poly-dimethyl-silicone surfactants, available from BYK Chemie of Wesel, Germany under the trade name BYK® 300; and other commercially available surfactants known to those skilled in the art. It is preferred that the surfactants are non-ionic surfactants.

The inkjet ink may also include conventional additives, known for producing specific effects on the ink composition. For example, the ink may include one or more biocides to allow long term stability of the ink composition. Suitable biocides for use in the ink include benz-isothiazolin-one, methyl-isothiazolin-one, chloro-methyl-isothiazolin-one, sodium dihydroacetate, sodium sorbate, sodium 2-pyridinethiol-1-oxide, sodium benzoate and sodium pentachlorophenol. Examples of commercially available biocides are Zolidine®, Proxel®, Givguard™, Canguard™327® and KATHAN® PFM.

The inkjet ink may further include fungicides, bactericides, penetrants, anti-coagulation agents, anti-curling agents and/or buffers, various examples and effects of which are known in the art. It is preferred that the ink have a pH level between about 6.5 to about 8.5.

Table 2 below illustrates six examples of MICR inkjet ink formulations considered by the inventors using the MIO/Co dispersion examples of Table 1. Table 2 illustrates ingredients by a percentage of total weigh of final ink composition.

TABLE 2

| Ingredient | Ink 1 | Ink 2 | Ink 3 | Ink 4 | Ink 5 | Ink 6 |
| --- | --- | --- | --- | --- | --- | --- |
| MIO dispersion | Disp. 1 | Disp. 1 | Disp. 3 | Disp. 3 | Disp. 4 | Disp. 4 |
| MIO % in ink | 21.0% | 21.0% | 25.0% | 28.0% | 25.0% | 33.0% |
| Surfactant | 0.7% | 0.7% | 0.7% | 0.7% | 0.7% | 0.7% |
| 2-pyrrolidione | 6.0% | 6.0% | 6.0% | 6.0% | 0.0% | 0.0% |
| 1-methoxthy-2-propanol | 2.0% | 2.0% | 2.0% | 2.0% | 0.0% | 0.0% |
| Triethylene glycol | 2.0% | 2.0% | 2.0% | 2.0% | 0.0% | 0.0% |
| Dowanol PM | 5.0% | 5.0% | 5.0% | 5.0% | 5.0% | 5.0% |
| Biocide | 0.2% | 0.2% | 0.2% | 0.2% | 0.2% | 0.2% |
| D.I Water | Balanced | Balanced | Balanced | Balanced | Balanced | Balanced |

The above inkjet MICR inks were evaluated using a black chamber in a printer known by the trade name WorkForce® 3520, available from Seiko Epson Corporation of Japan. The text or image was printed on paper known by the trade name Hammermill® Tidal Colorlok®, available from International Paper Company Corporation of Memphis, Tenn. The MICR signal was measured by a MICR Qualifier GTX®, available from RDM Corporation of Ontario, Canada.

Table 3, below, illustrates print quality and MICR signal strength of the different ink compositions illustrated in Table 2. The ANSI standard for MICR signal strength is ANSI X 9.1 00-20:2006.

TABLE 3

| Formula | Ink 1 | Ink 2 | Ink 3 | Ink 4 | Ink 5 | Ink 6 |
| --- | --- | --- | --- | --- | --- | --- |
| Print quality | Good | Good | Good | Good | Good | Good |
| MICR Signal Strength (ColorLok Paper) | low | low | Bellow ANSI Std. | Bellow ANSI Std. | Bellow ANSI Std. | Met ANSI Std. |

Use of 30% or higher MIO/Co concentration in the final inkjet ink composition ensures both good print quality and a MICR signal strength that meets or exceeds the ANSI standard, using only a single print layer.

What is claimed is:

1. A method of making an aqueous MICR inkjet ink comprising:
   mixing a magnetic iron oxide with cobalt doping pigment with humectant, polymeric dispersant and water to create an emulsion containing, magnetic iron oxide with cobalt doping pigment at about between 20% to 60% by weight, a polymeric dispersant, and humectant at about between 5% to 30% by weight; milling the emulsion in a wet media mill to obtain a particle size less than 200 nm; and
   adding additional humectant, surfactant and/or solvent to the milled mixture in quantities that do not dilute the amount of pigment in the inkjet ink.

2. The method of claim 1 wherein the polymeric dispersant selected from the group consisting of polyacrylates, polymethacrylates, styrene-acrylate copolymers, styrene-methacrylate copolymers, and mixtures thereof is between 5% to 25% by weight.

3. The method of claim 1 wherein the humectant selected from the group consisting of alcohols, glycols, pyrrolidones and mixtures thereof is between 0% to 20% by weight.

* * * * *